United States Patent
Morimoto

(10) Patent No.: US 7,313,364 B2
(45) Date of Patent: Dec. 25, 2007

(54) PERSONAL DIGITAL ASSISTANT, WIRELESS COMMUNICATION SYSTEM, AND METHOD OF ESTABLISHING LINK

(75) Inventor: Hiroyuki Morimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 512 days.

(21) Appl. No.: 10/258,589

(22) PCT Filed: Mar. 16, 2001

(86) PCT No.: PCT/JP01/02124

§ 371 (c)(1),
(2), (4) Date: Nov. 1, 2002

(87) PCT Pub. No.: WO02/075962

PCT Pub. Date: Sep. 26, 2002

(65) Prior Publication Data

US 2003/0092389 A1 May 15, 2003

(51) Int. Cl.
*H04B 7/00* (2006.01)
*H04B 5/00* (2006.01)

(52) U.S. Cl. .................. 455/41.2; 455/41.1; 455/566; 455/414.2; 455/415; 455/456.1

(58) Field of Classification Search ............... 455/41.1, 455/45.2, 41.2, 403, 420, 500, 507–508, 455/442.1, 518–519, 41.3, 66.1, 566, 404.2, 455/412.1, 412.2, 414.1, 414.2, 414.3, 415, 455/421, 422.1, 456.1, 456.2, 456.3, 456.5, 455/456.6, 457, 458, 466, 506, 515
See application file for complete search history.

(56) References Cited

U.S. PATENT DOCUMENTS

| | | | |
|---|---|---|---|
| 6,275,500 B1 * | 8/2001 | Callaway et al. | 370/449 |
| 6,519,460 B1 * | 2/2003 | Haartsen | 455/452.1 |
| 6,691,173 B2 * | 2/2004 | Morris et al. | 709/249 |
| 6,711,414 B1 * | 3/2004 | Lightman et al. | 455/517 |
| 6,721,552 B1 * | 4/2004 | Jamieson et al. | 455/403 |
| 6,928,295 B2 * | 8/2005 | Olson et al. | 455/522 |

FOREIGN PATENT DOCUMENTS

| | | |
|---|---|---|
| EP | 1 022 876 | 7/2000 |
| EP | 1 024 628 | 8/2000 |
| EP | 1041520 | 10/2000 |
| JP | 9-107325 | 4/1997 |
| JP | 10-105803 | 4/1998 |
| JP | 2000-123138 | 4/2000 |

(Continued)

OTHER PUBLICATIONS

U.S. Appl. No. 10/258,589, filed Nov. 1, 2002, pending.

(Continued)

*Primary Examiner*—Pablo N. Tran
(74) *Attorney, Agent, or Firm*—Oblon, Spivak, McClelland, Maier & Neustadt, P.C.

(57) ABSTRACT

When a cellular phone 11 is placed in an area near a fixed terminal 12, a peculiar device address sent from the fixed terminal 12 is received, and a link of a bluetooth system with the fixed terminal 12 is established by using the peculiar device address.

7 Claims, 2 Drawing Sheets

FOREIGN PATENT DOCUMENTS

| | | |
|---|---|---|
| JP | 2000-217279 | 8/2000 |
| JP | 2000-224156 | 8/2000 |
| JP | 2000-224197 | 8/2000 |
| WO | 98/58510 | 12/1998 |
| WO | WO 9922493 A2 * | 5/1999 |

OTHER PUBLICATIONS

U.S. Appl. No. 10/276,317, filed Nov. 25, 2002, pending.
U.S. Appl. No. 10/275,989, filed Nov. 20, 2002, pending.

Haatsen J.: "Bluetooth-The universal radio interface for ad hoc, wireless connectivity", Ericsson Review, Ericsson, Stockholm, SE, No. 3, 1998, pp. 110-117, XP000783249 ISSN: 0014-0171.

Nosovic M. et al.: "Lower Power Rendezvous and RFID Wakeup for Embedded Wireless Networks", 15th Annual IEEE Computer Communications Workshop (CCW 2000), [Online], Oct. 15-18, 2000, XP002372185, Captiva Island, Florida, US Retrieved from the internet (w/ abstract).

* cited by examiner

PERSONAL DIGITAL ASSISTANT, WIRELESS COMMUNICATION SYSTEM, AND METHOD OF ESTABLISHING LINK

TECHNICAL FIELD

The present invention relates to a personal digital assistant, a radio communication system and a link establishing method for establishing a link of a bluetooth system.

BACKGROUND ART

FIG. 1 is a view showing the configuration of a conventional radio communication system. 1 indicates a cellular phone functioning as a personal digital assistant (or a portable information terminal). 2 to 6 indicate a plurality of fixed terminals such as dispensers respectively. The fixed terminals 2 to 6 are disposed in a peripheral area of the cellular phone 1.

Next, an operation will be described below.

For example, a user operates the fixed terminal 2 by using the cellular phone 1, the cellular phone 1 and the fixed terminal 2 are connected with each other through a link of a bluetooth system.

In detail, when the establishment of a link of the bluetooth system is desired, as shown in FIG. 2, an address request signal called "inquiry" is output from the cellular phone 1.

When the address request signal output from the cellular phone 1 is received in the fixed terminal 2, a device address peculiar to the fixed terminal 2 is returned from the fixed terminal 2 to the cellular phone 1 as an "inquiry response".

In the cellular phone 1, when the peculiar device address returned from the fixed terminal 2 is received, a page sequence prescribed by a specification of the bluetooth system is performed to acknowledge a device address of the cellular phone 1 and the device address of the fixed terminal 2, and a link between the cellular phone 1 and the fixed terminal 2 is established.

Also, in addition to the above-described prior art, a technique for using a new device for a radio local area network is disclosed in Published Unexamined Japanese Patent Application No. 2000-224197.

However, this technique merely relates to the structuring of the radio local area network and differs from the technique for connecting two devices with each other through the bluetooth system.

Because the conventional radio communication system has the above-described configuration, after the address request signal is output from the cellular phone 1, the cellular phone 1 is required to wait for the device address sent from the fixed terminal 2. Therefore, a problem has arisen that it is impossible to rapidly establish a link of the bluetooth system between the cellular phone 1 and the fixed terminal 2.

Also, in addition to the fixed terminal 2, when the other fixed terminals 3 to 6 send device addresses to the cellular phone 1 respectively in response to the address request signal, the cellular phone 1 is required to select a desired fixed terminal to be connected with the cellular phone 1. Therefore, a time required to establish a link of the bluetooth system is further prolonged.

The present invention is provided to solve the above-described problem, and the object of the present invention is to provide a personal digital assistant, a radio communication system and a link establishing method for rapidly establishing a link of the bluetooth system.

DISCLOSURE OF THE INVENTION

A personal digital assistant according to the present invention includes address receiving means for receiving a device address peculiar to a connecting device in an area near the connecting device, and link establishing means for establishing a link of a bluetooth system with the connecting device by using the device address received by the address receiving means.

Therefore, the link of the bluetooth system can be rapidly established.

In the personal digital assistant according to the present invention, the address receiving means receives an electric power from the connecting device and performs a receiving operation of the device address.

Therefore, the device address can be received without arranging a power source in the personal digital assistant.

In the personal digital assistant according to the present invention, the link establishing means performs a page sequence prescribed in a specification of the bluetooth system and establishes the link of the bluetooth system with the connecting device.

Therefore, the link of the bluetooth system can be easily established.

In the personal digital assistant according to the present invention, the device address received by the address receiving means is displayed.

Therefore, a user can confirm the device address.

A radio communication system according to the present invention includes a connecting device for sending a particular device address, and a personal digital assistant for receiving the peculiar device address sent from the connecting device in an area near the connecting device and establishing a link of a bluetooth system with the connecting device by using the device address.

Therefore, the link of the bluetooth system can be rapidly established.

In the radio communication system according to the present invention, the connecting device is formed of a fixed terminal.

Therefore, the link of the bluetooth system with the fixed terminal can be established.

In the radio communication system according to the present invention, the connecting device is formed of another personal digital assistant.

Therefore, the link of the bluetooth system with another personal digital assistant can be established.

A link establishing method according to the present invention includes the steps of receiving a peculiar device address sent from a connecting device in an area near the connecting device, and establishing a link of a bluetooth system with the connecting device by using the device address.

Therefore, the link of the bluetooth system can be rapidly established.

BEST MODE FOR CARRYING OUT THE INVENTION

Hereinafter, the best mode for carrying out the present invention will now be described with reference to the accompanying drawings to explain the present invention in more detail.

Embodiment 1

Figure 3:
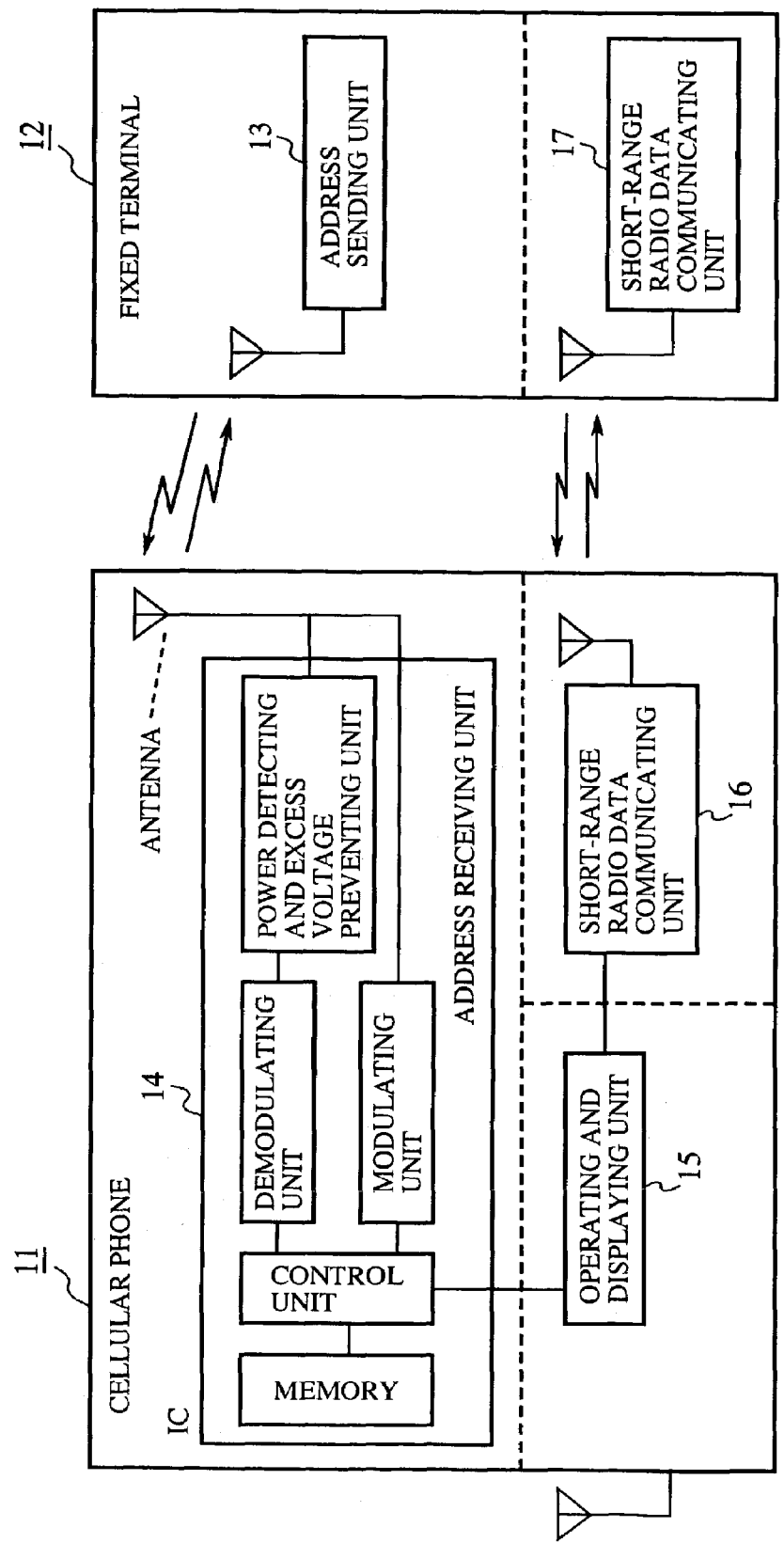
FIG. 3 is a view showing the configuration of a radio communication system according to a first embodiment of the present invention.

FIG. 3 is a view showing the configuration of a radio communication system according to a first embodiment of the present invention.

In FIG. 3, 11 indicates a cellular phone functioning as a personal digital assistant. 12 indicates a fixed terminal (or a connecting device) such as a dispenser. The fixed terminal 12 is planned to be connected with the cellular phone 11.

13 indicates an address sending unit for providing an electric power to the cellular phone 11 according to electromagnetic induction and sending a peculiar device address to the cellular phone 11. 14 indicates an address receiving unit (or address receiving means). An operation of the address receiving unit 14 is started when the electric power is received from the fixed terminal 12 according to the electromagnetic induction, and the device address of the fixed terminal 12 is received in the address receiving unit 14. The address receiving unit 14 is, for example, formed of a non-contact type integrated circuit (IC) card.

15 indicates an operating and displaying unit (or displaying means) for displaying both the device address received in the address receiving unit 14 and an address detection completion message and receiving a request of the connection based on the bluetooth system from a user. 16 indicates a short-range radio data communicating unit (or link establishing means) for establishing a link of the bluetooth system with the fixed terminal 12 by using the device address received in the address receiving unit 14 when the request of the connection is received in the operating and displaying unit 15. 17 indicates a short-range radio data communicating unit of the fixed terminal 15 for establishing a link of the bluetooth system with the short-range radio data communicating unit 16 of the cellular phone 11.

Figure 1:
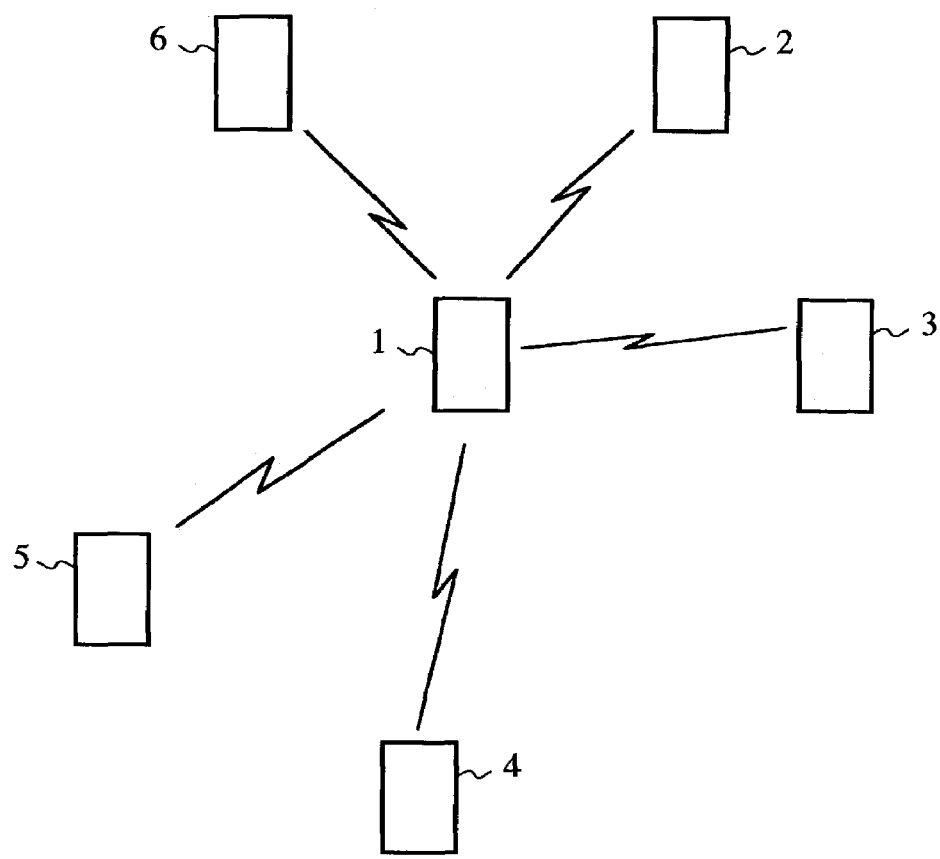
FIG. 1 is a view showing the configuration of a conventional radio communication system.
Figure 2:
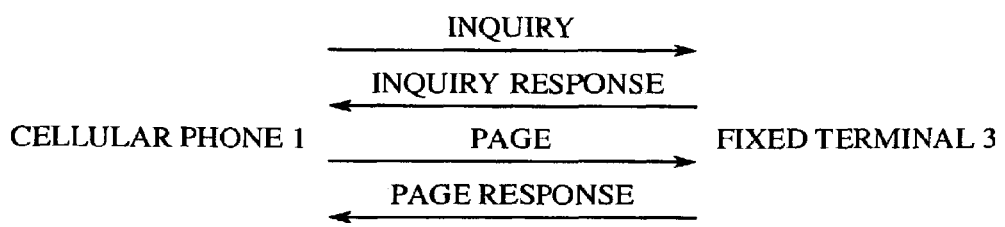
FIG. 2 is a sequence view showing the procedure of establishing a link.
Figure 4:
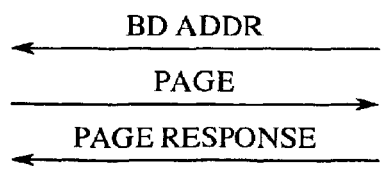
FIG. 4 is a sequence view showing the procedure of establishing a link.

FIG. 4 is a sequence-view showing the procedure of establishing a link.

Next, an operation will be described below.

When the cellular phone 11 approaches the fixed terminal 12 within a distance of several millimeters, the address sending unit 13 excites the address receiving unit 14 of the cellular phone 11 according to electromagnetic induction and an electric power is provided from the address sending unit 13 to the address receiving unit 14. Also, "BD ADDR" denoting a peculiar device address of the fixed terminal 12 is sent from the address sending unit 13 to the address receiving unit 14 of the cellular phone 11.

In the address receiving unit 14 of the cellular phone 11, when the electric power is received from the address sending unit 13 of the fixed terminal 12, the processing for receiving the device address sent from the address sending unit 13 is performed, and the device address is output to the operating and displaying unit 15. Here, because the device address is sent from the address sending unit 13 by using a very weak radio wave, the cellular phone 11 cannot receive the device address when the cellular phone 11 is placed away from the fixed terminal 12 by a certain distance.

In the operating and displaying unit 15 of the cellular phone 11, when the device address of the fixed terminal 12 is received from the address receiving unit 14, the device address is displayed on a display, and an address detection completion message is displayed on the display. Also, the operating and displaying unit 15 inquires of a user whether or not the connection based on the bluetooth system is performed. When a request of the connection is received from the user, an operation of the short-range radio data communicating unit 16 is started by the operating and displaying unit 15.

In the short-range radio data communicating unit 16, when the operating and displaying unit 15 receives the request of the connection, a page sequence prescribed in a specification of the bluetooth system is performed, a device address of the cellular phone 11 and the device address of the fixed terminal 12 are acknowledged, and a link of the bluetooth system between the short-range radio data communicating unit 17 of the fixed terminal 12 and the short-range radio data communicating unit 16 of the cellular phone 11 is established.

As is apparent from the above description, in the first embodiment, when the cellular phone 11 is placed in an area near the fixed terminal 12, a peculiar device address sent from the fixed terminal 12 is received in the cellular phone 11, and a link of the bluetooth system between the fixed terminal 12 and the cellular phone 11 is established according to the peculiar device address. Therefore, the cellular phone 11 is not required to wait for the response of the device address or is not required to select a desired fixed terminal which is planned to be connected with the cellular phone 11, and the link of the bluetooth system can be established. Accordingly, the link of the bluetooth system can be rapidly established.

Embodiment 2

In the first embodiment, when the request of the connection is received in the operating and displaying unit 15, the page sequence prescribed by the specification of the bluetooth system is performed. However, it is applicable that the page sequence be immediately performed when the device address is received in the address receiving unit 14.

Embodiment 3

In the first embodiment, the fixed terminal 13 is used as a device to be connected with the cellular phone 11. However, the first embodiment is not limited to the fixed terminal 13. For example, it is applicable that a personal digital assistant such as another cellular phone be used as a device to be connected with the cellular phone 11.

INDUSTRIAL APPLICABILITY

As is described above, the personal digital assistant, the radio communication system and the link establishing method according to the present invention are appropriate to the establishment of a link of the bluetooth system rapidly performed while omitting a wasteful procedure when the establishment of the link of the bluetooth system is desired.

What is claimed is:

1. A personal digital assistant, comprising:
    an address receiving unit configured to receive a device address peculiar to a connecting device in an area near the connecting device based on a proximity to the connecting device and without sending an inquiry message to the connecting device;
    a link establishing unit configured to establish a link of a bluetooth system with the connecting device by using the device address received by the address receiving unit; and
    a display unit configured to display the device address received by the address receiving unit, wherein the display unit is configured to display an address detection completion message and a message inquiring as to whether the link of the bluetooth system with the connecting device is to be performed.

2. A personal digital assistant according to claim 1, wherein the address receiving unit is configured to receive an electric power from the connecting device and performs a receiving operation of the device address.

3. A personal digital assistant according to claim 1, wherein the link establishing means unit is configured to establish the link of the bluetooth system with the connecting device.

4. A radio communication system, comprising:
a connecting device configured to send a particular device address;
a personal digital assistant configured to receive the peculiar device address sent from the connecting device in an area near the connecting device based on a proximity to the connecting device and without sending an inquiry message to the connecting device, and configured to establish a link of a bluetooth system with the connecting device by using the device address; and
a display unit configured to display the device address received by the personal digital assistant,
wherein the display unit is further configured to display an address detection completion message and a message inquiring as to whether the link of the bluetooth system with the connecting device is to be performed.

5. A radio communication system according to claim 4, wherein the connecting device is formed of a fixed terminal.

6. A radio communication system according to claim 4, wherein the connecting device is formed of another personal digital assistant.

7. A link establishing method, comprising the steps of:
receiving a peculiar device address sent from a connecting device in an area near the connecting device based on a proximity to the connecting device and without sending an inquiry message to the connecting device;
establishing a link of a bluetooth system with the connecting device by using the device address;
displaying the device address received in the receiving step on a display unit;
displaying an address detection completion message on the display unit; and
displaying a message inquiring as to whether the link of the bluetooth system with the connecting device is to be performed.

* * * * *